Figure 1:
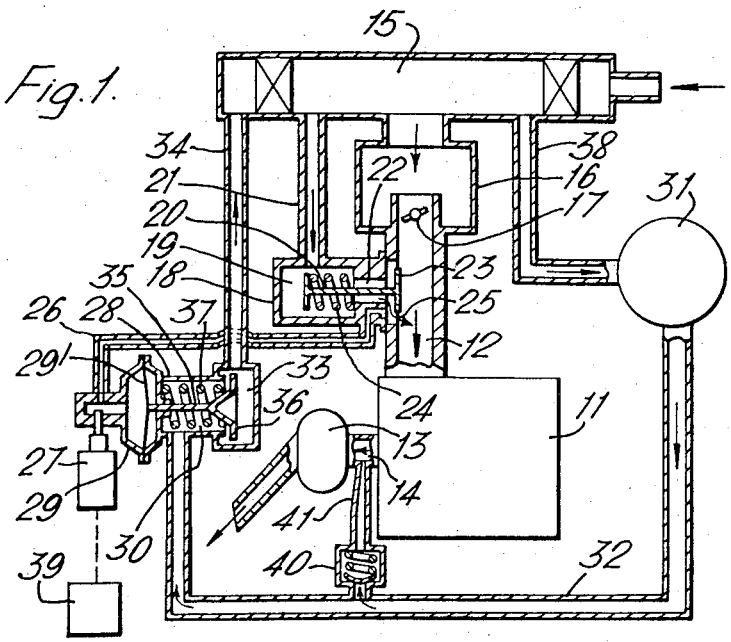

United States Patent [19]
Tatsutomi et al.

[11] 3,716,991
[45] Feb. 20, 1973

[54] EXHAUST GAS PURIFYING DEVICE

[75] Inventors: Yasuo Tatsutomi; Hiroshi Shimizu, both of Hiroshima, Japan

[73] Assignee: Toyo Kogyo Co., Ltd., Aki-gun, Hiroshima-ken, Japan

[22] Filed: April 28, 1971

[21] Appl. No.: 138,146

[30] Foreign Application Priority Data

April 28, 1970 Japan..................................45/41661

[52] U.S. Cl.............60/289, 123/117 R, 123/148 DS
[51] Int. Cl...............................................F02b 75/10
[58] Field of Search........60/274, 284, 285, 287, 288, 60/289; 123/117 A, 117 R, 148 DS

[56] References Cited

UNITED STATES PATENTS

| | | | |
|---|---|---|---|
| 2,670,724 | 3/1954 | Reggio | 123/117 A |
| 3,534,717 | 10/1970 | Froede | 60/286 |
| 3,584,608 | 6/1971 | Shibagaki | 123/117 R |
| 3,626,909 | 12/1971 | Hayashida | 123/117 A |
| 3,646,764 | 3/1972 | Nakajima | 60/286 |

*Primary Examiner*—Douglas Hart
*Attorney*—Craig, Antonelli & Hill

[57] ABSTRACT

An exhaust gas purifying device comprises an improved control system for controlling a device for regulating the flow of a supplementary air to the afterburner, disposed in an exhaust system of an internal combustion engine, or a device for controlling the spark-plug ignition timing, in response to the difference between the temperature of the internal combustion engine and the ambient temperature around the engine for the purpose of reducing to an inappreciable value the amount of noxious unburned compounds present in an exhaust gas emerging from the exhaust system of the engine. The difference of temperature therebetween can be detected by a combined pair of thermal sensitive elements such as thermistors or the like. An essential advantage of the present invention is that the ambient temperature is taken into consideration for efficiently and advantageously operating the exhaust gas purifying device.

9 Claims, 6 Drawing Figures

EXHAUST GAS PURIFYING DEVICE

The present invention relates to an exhaust gas purifying device for an internal combustion engine and, more particularly, to a control system operable in response to a difference between the engine temperature and the ambient temperature thereby to control the exhaust gas purifying device for an internal combustion engine.

It has been largely admitted that an exhaust gas emerging from an exhaust system of each automobile having an internal combustion engine constitutes one of the most significant sources of atmospheric pollution in many cities of the world, in view of the fact that the bulk of the polluting emissions come from the automobile exhaust system in the form of unburned hydrocarbons and nitrogen oxides present in the exhaust gas. In order to reduce the amount of such unburned compounds as small as possible in view of the current and future air-pollution standards which have in common a tendency to be strict, there have been proposed such exhaust gas purifying devices as a device for controlling the ignition timing in such a manner as to retard the ignition timing in response to the engine condition and a device for controlling the flow of a supplementary air directed to the afterburner, disposed in the exhaust system, in response to the engine condition.

Specifically, it has been well recognized among automobile operators that the engine should be initially warmed up to a predetermined engine temperature to efficiently effect combustion of fuel-air mixture of proper ratio in the engine cylinders. This is to be true especially when the automotive vehicle is to be driven during the winter season or in a severely cold district. In this case, during a period in which the engine is warmed up, the temperature of the engine body increases in a predetermined time from a value substantially equal to the ambient temperature around the engine body to the maximum value achieved by the engine body. However, the maximum temperature achieved by the engine body is usually affected by the ambient temperature predominant during such period in which the engine is warmed up. In other words, the lower the ambient temperature is, the lower the maximum temperature is achieved by the engine body.

According to the prior art, the control system of a similar character above referred to is generally designed such as to operate in response to the engine temperature irrespective of the ambient temperature around the engine body. In other words, the conventional control system is designed such that, the exhaust gas purifying system can be controlled when the engine temperature reaches to an optimum value at which combustion of fuel-air mixture can be efficiently effected. In this case, if the ambient temperature is extremely low such as wherein the automotive vehicle is to be driven during the winter season or in the severely cold district, it will oftentimes occur that the maximum temperature achieved by the engine body after the latter has been warmed up still remains lower than the optimum value at which combustion of fuel-air mixture can be efficiently effected in the engine cylinders. Accordingly, the conventional control device of a similar character above referred to has a drawback in that the exhaust gas purifying device cannot be punctually operated at the time the purifying system is to be operated, resulting in that not only the loss of efficiency of the engine will occur, but also the durability of the afterburner will be shortened with a relatively large amount of the noxious unburned compounds to be discharged to the atmosphere. This is essentially attributable to the fact that, in the design practice of the control system of a similar character above referred to, no account has been paid to the ambient temperature around the engine body which, in many cases, affects the maximum temperature achieved by the engine body after the latter has been warmed up.

Accordingly, one object of the present invention is to provide an improved control system operable in response to a difference between the engine temperature and the ambient temperature around the engine body thereby to control the exhaust gas purifying device for an internal combustion engine.

Another object of the present invention is to provide an improved control system adaptable in association with the ignition timing control device for control of the ignition timing during a period in which the engine is warmed up, for the purpose of reducing to an inappreciable value the amount of noxious unburned compounds present in an exhaust gas emerging from the exhaust system of an internal combustion engine.

A further object of the present invention is to provide an improved control system adaptable in association with a valving means for controlling the flow of a supplementary air to the afterburner disposed in the exhaust system, for the purpose of reducing to an inappreciable value the amount of noxious unburned compounds present in an exhaust gas emerging from the exhaust system of an internal combustion engine.

A still further object of the present invention is to provide an improved control system adapted to efficiently operate the exhaust gas purifying device under optimum condition in response to the difference between the engine temperature and the ambient temperature around the engine body even though the latter is driven during the winter season or in a severely cold district.

A still further object of the present invention is to provide an improved control system which may be adaptable in any field of art wherein an external device operably connected with such control system is to be operated in response to the difference between the temperature of an object associated with such external device and the ambient temperature around the object.

A still further object of the present invention is to provide an improved control system for controlling the exhaust gas purifying device for an internal combustion engine reliably and accurately which can be constructed with inexpensive electronic parts.

According to the present invention, the control system essentially includes at least one pair of thermal responsible resistance elements; one of which is utilized to detect the temperature of the internal combustion engine and the other is utilized to detect the temperature of the environment in which the internal combustion engine is placed. In this case, the first mentioned thermal responsible resistance element may be disposed so as to detect the temperature of the engine body, cooling medium generally used to cool the warmed engine or exhaust gas present in the exhaust system of the engine in order to obtain the engine temperature. In order to obtain the ambient temperature on the other hand, the second mentioned thermal responsible resistance element may be similarly disposed so as to detect the temperature of the environment, for example, within the vehicle front body in such a manner that the second mentioned thermal responsible resistance element is spaced from the engine proper a suitable distance sufficient enough to prevent it from being affected by the heat transmitted from the engine proper, but to substantially detect the temperature of the outside of the vehicle body.

Furthermore, according to the present invention, the difference detected between the engine temperature and the ambient temperature may be selected as desired depending upon the performance characteristic of each of the thermal responsible resistance elements employed. In the forthcoming description of the preferred embodiments of the present invention, a pair of thermistors is used for the thermal responsible resistance elements and, because of their performance characteristics selected to give an optimum performance of the control system of the present invention, the value of the engine temperature at the time the exhaust gas purifying device is controlled varies in accordance with variations in the ambient temperature.

Accordingly, the exhaust gas purifying device operably associated with the control system of the present invention can be advantageously and efficiently controlled while the engine is warmed up in a severely cold district or during the winter season where the ambient temperature considerably affects the maximum temperature achieved by the engine.

These and other objects and features of the present invention will become apparent from the following description thereof taken in conjunction with preferred embodiments only for the illustrative purpose, in which;

FIG. 1 is a schematic diagram of an exhaust gas purifying device incorporated in an internal combustion engine, to which the present invention may be applicable.

Figure 3:
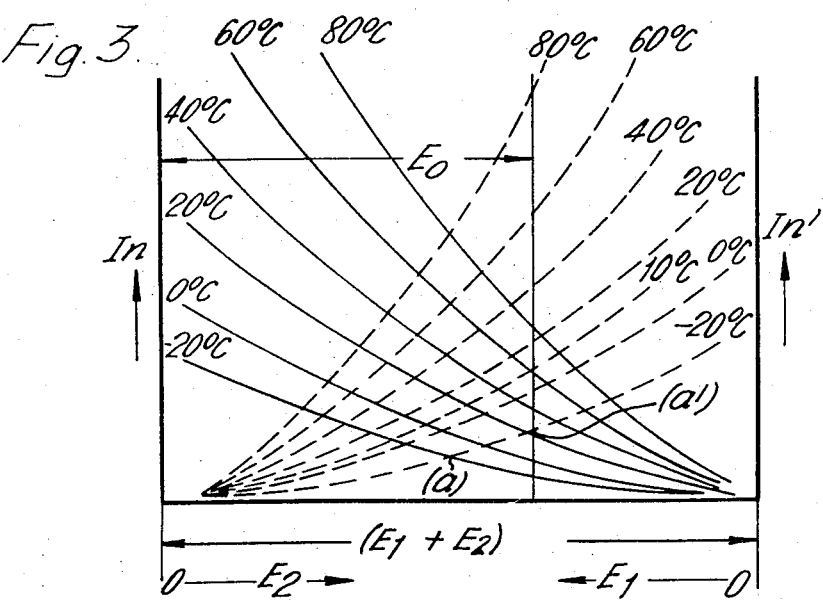
Figure 2:
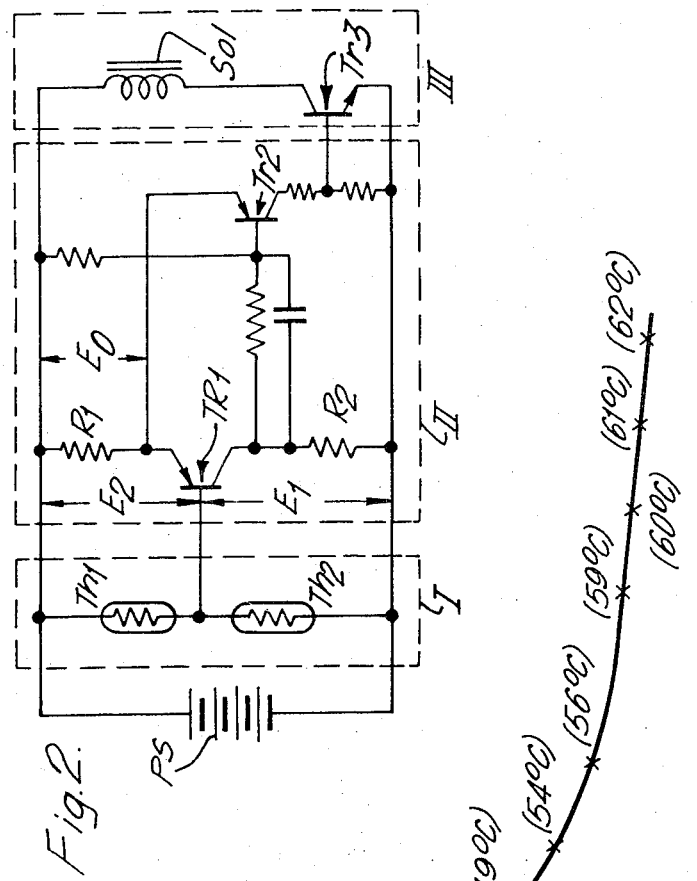
Figure 4:
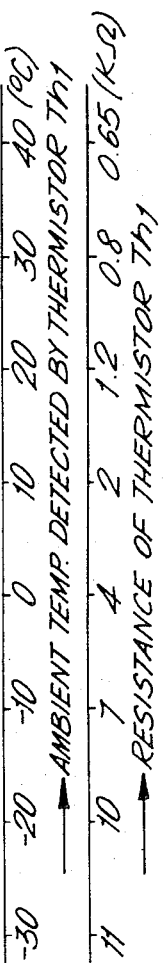
Figure 4:
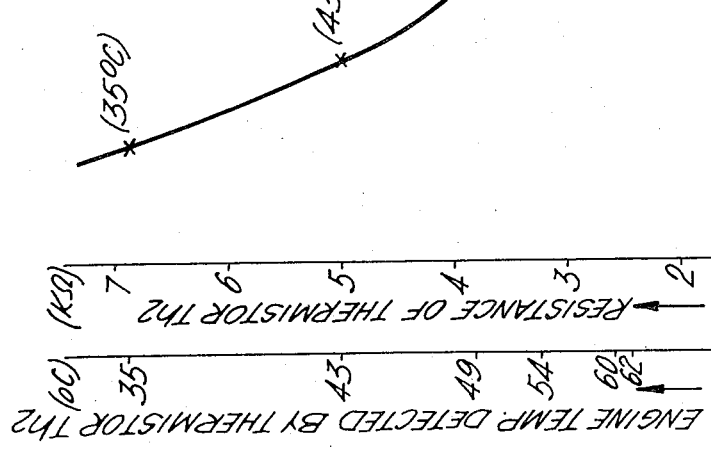
Figure 5:
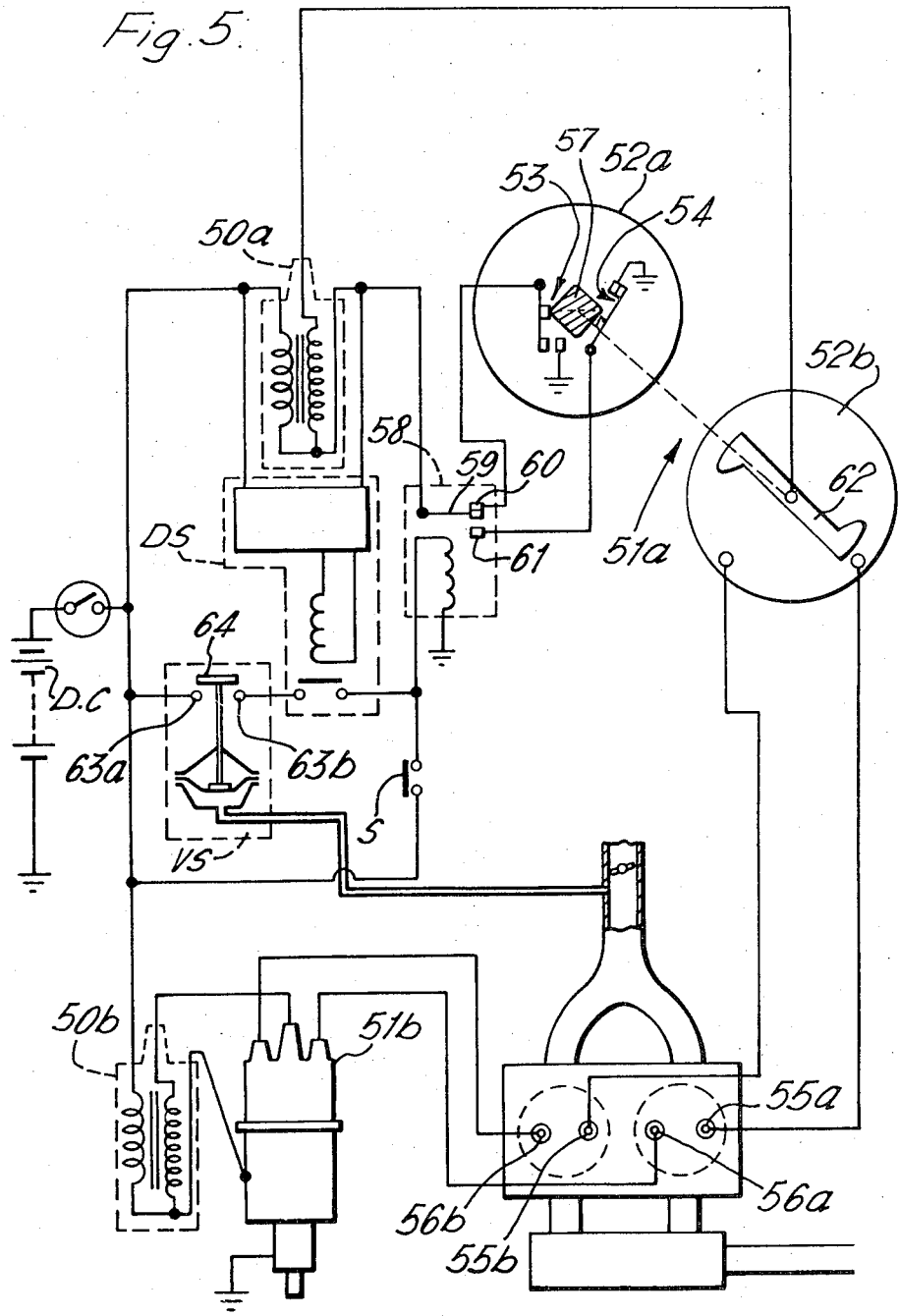
Figure 6:
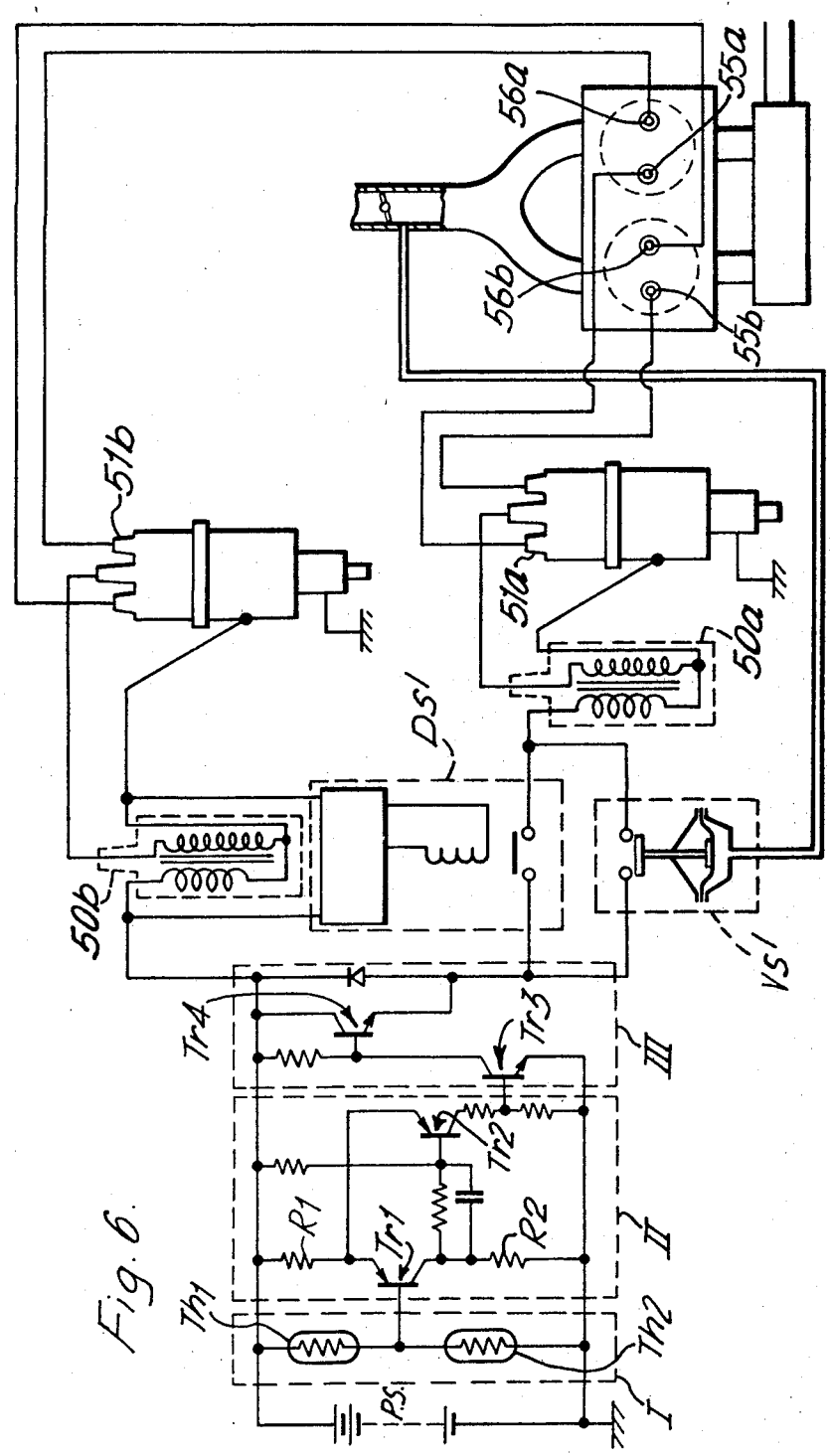

FIG. 2 is a circuit diagram of a control system embodying the present invention, FIG. 3 is a performance chart of the thermal responsible resistance elements, i.e., thermistors, in respect of the engine and ambient temperatures, FIG. 4 is a performance curve of the thermistor employed for detecting the engine temperature relative to variations in the ambient temperature detected by the other thermistor, FIG. 5 is a circuit diagram of one exemplary type of spark-plug ignition timing control to which the present invention may be applicable, and FIG. 6 is a circuit diagram of another exemplary type of spark-plug ignition timing control in which a modified control system of the present invention is incorporated.

Referring now to FIG. 1, an internal combustion engine 11 so far described may be of any construction and, as well known in the art, includes a plurality of combustion chambers (not shown) to which an air-fuel mixture is supplied through an inlet manifold 12. The exhaust gas produced in the combustion chambers is adapted to be discharged into the atmosphere by means of an exhaust system including a reactor 13 for effecting the reduction, elimination and oxidation of unburned compounds contained in the exhaust gas and an exhaust manifold 14 connecting between said combustion chambers and said reactor 13.

The inlet manifold 12 has one end connected with the combustion chambers as previously described and the other end connected with an air cleaner 15 through a conventional carburetor 16, the latter being shown as including therein a throttle valve 17.

Rigidly fitted to the outer wall of the inlet manifold 12 is a pressure sensitive valve 18 formed with a working chamber 19 in which a piston member 20 is operatively accommodated. The working chamber 19 of this pressure sensitive valve 18 is communicated with the air cleaner 15 through a suitable conduit 21 and also with the interior of the inlet manifold 12 through a bore 22 formed in said valve 18. The piston member 20 is extended through said bore 22 and rigidly connected with a closure member 23 which is exposed to the interior of the inlet manifold 12. This piston member 20 is normally urged to the left by the action of a resilient member 24, for example, a compression spring, housed in the working chamber 19, so as to close said bore 22.

This pressure sensitive valve 18 so far described can be operated in such a manner that, when a negative pressure of sufficient value is generated in the inlet manifold 12, the piston member 20 is moved to the right against the resilient member 24 thereby to communicate the air cleaner 15 to the interior of the inlet manifold 12 through the working chamber 19.

Disposed in the close vicinity of said bore 22 is an opening 25 connected with one end of a passage 26 of which the other end is connected with a solenoid valve 27, so that said passage can be communicated with the inlet manifold 12 whenever the pressure sensitive valve 18 is in position to shut off the communication between the air cleaner 15 to the interior of the inlet manifold 12 through the working chamber 19, but that the value of pressure within said passage 26 can be substantially equalized to that of the atmospheric pressure even when the negative pressure of sufficient value is generated in the inlet manifold 12 when the vehicle is decelerated and the valve 18 is accordingly brought into the position to permit the flow of air from the air cleaner 15 to the interior of the inlet manifold 12.

A relief valve generally indicated by 28 comprises a diaphragm chamber 29 having first and second rooms therein divided by a diaphragm 29', a first working chamber 30 connected with an air feeder device 31 through a suitable conduit 32, and a second working chamber 33 connected with the air cleaner 15 through a suitable conduit 34. This relief valve 28 further includes a piston member 35, one end of which being rigidly connected with the diaphragm 29' while the other end being rigidly connected with a closure member 36 adapted to enclose the first working chamber 30. This piston member 35 is normally urged to the right by the action of a resilient member 37, for example, a compression spring, disposed between the depth of the first working chamber 30 and the closure member 36 around said piston member 35. The air feeder device 31 is in turn connected with the air cleaner 15 through a suitable conduit 38.

The other end of the passage 26 connected with the solenoid valve 27 as previously mentioned is in turn connected with the first room of the diaphragm chamber 29 of the relief valve 28. The solenoid valve 27 is electrically connected with a detector 39 for detecting the engine speed and adapted to close the communication between the passage 26 and the first room of the diaphragm chamber 29 when an electric signal representative of the high engine speed is applied thereto by the detector 39 and to permit the communication therebetween when an electric signal representative of the low engine speed is applied thereto by the detector 39, irrespective of the vehicle driving condition.

Disposed in shunt with the conduit 32 is a check valve 40 which is in turn connected with the exhaust manifold 14 at an intermediate position between the engine 11 and the reactor 13 through an elongated nozzle 41.

In the arrangement of the exhaust gas purifying device of the present invention as hereinbefore fully described, when the engine speed is high during a period in which an automotive vehicle is normally driven, the throttle valve 17 is in the full open position and the value of pressure within the inlet manifold 12 is therefore small. In this condition, the solenoid valve 27 is in position to close the communication between the passage 26 and the first room of the diaphragm chamber 29. However, a secondary air supplied to the first working chamber 30 from the air cleaner 15 through the conduit 32 by means of the air feeder device 31 passes through the second working chamber 33 of the relief valve 28 onto the air cleaner 15. The check valve 40 is at this time closed since the value of pressure in the conduit 32 is small enough to maintain said check valve 40 in the closed position.

When the engine speed is reduced to a small value during the same period, negative pressure will be generated in the inlet manifold 12. However, the value of the negative pressure is still as small as the pressure sensitive valve 18 cannot be operated. On the other hand, the solenoid valve 27 is at this time brought into the open position to establish the communication between the passage 26 and the first room of the diaphragm chamber 29 whereby the negative pressure within the inlet manifold 12 acts to draw the pressure in the passage 26 and thus in the first room of the diaphragm chamber 29 of the relief valve 28, resulting in that the piston member 35 of the relief valve 28 is moved to the left against the resilient member 37 thereby to close the communication between the conduits 32 and 34. Upon closure of the communication between the conduits 32 and 34, the value of the air pressure in the conduit 32 commences to increase whereby the check valve 40 can be operated so as to permit the flow of the secondary air to the exhaust manifold 14 through the elongated nozzle 41. The secondary air thus supplied to the exhaust manifold 14 flows to the reactor 13 wherein, with this secondary air thus supplied, unburned compounds present in the exhaust gas can be purified.

In the case where the throttle valve 17 is brought into the closed position so that an automotive vehicle can be decelerated, the value of the negative pressure within the inlet manifold 12 increases to a high value sufficient to overcome the resilient force of the resilient member 24, irrespective of the engine speed, thereby to cause the piston member 20 of the pressure sensitive valve 18 to move to the right as shown in FIG. 1. As the piston member 20 moves to the right, a primary air is permitted to flow from the air cleaner 15 through the working chamber 19 to the interior of the inlet manifold 12 wherein said primary air is utilized to give an appropriate air-fuel mixture ratio. However, if the engine speed is high while the throttle valve 17 is in the closed position, the relief valve 28 is in position to permit the flow of the secondary air from the conduit 32 to the conduit 34 in a similar manner as hereinbefore described. On the contrary thereto, if the engine speed is low while the throttle valve 17 is in the open position, the solenoid valve 27 is in position to permit the communication between the passage 26 and the first room of the diaphragm chamber 29 of the relief valve 28. However, since the opening 25 connected with the adjacent end of the passage 26 is disposed in the close vicinity of the bore 22 of the pressure sensitive valve 18 as hereinbefore described, the value of the pressure in the passage 26 and thus in the first room of the diaphragm chamber 29 is substantially equalized to the value of pressure in the working chamber 19 of the valve 18 and thus the value of the atmospheric pressure. Therefore, the secondary air is permitted to flow from the conduit 32 to the conduit 34 and then to the air cleaner 15 without operating the check valve 40.

In the foregoing description of the exhaust gas purifying device, the solenoid valve 27 is disclosed as electrically connected with the detector 39. However, this may be connected with the control system in accordance with the teachings of the present invention.

Referring now to FIG. 2, a circuit arrangement of the control system according to the present invention generally comprises a detector circuit I including a pair of series connected first and second thermistors $Th_1$ and $Th_2$ disposed in parallel to a D.C. power source PS, one of said thermistors $Th_1$ being adapted to detect the ambient temperature while the other thermistor $Th_2$ being adapted to detect the engine temperature, a Schmitt circuit II including transistors $Tr_1$ and $Tr_2$ and a switching circuit III including a transistor $Tr_3$ and a solenoid coil Sol.

In the Schmitt circuit II, the transistor $Tr_1$ has the base connected with an intermediate junction between the thermistors $TH_1$ and $TH_2$ of the detector circuit I, the emitter thereof being connected with a positive terminal of the power source PS through a resistor $R_1$ and the collector connected with a negative terminal of the power source PS through a resistor $R_2$ and is adapted to be biased off when the voltage $E_2$ between the both ends of the first thermistor $Th_1$ is lower than the voltage $E_o$ between the both ends of the resistor $R_1$ and to be biased on when the voltage $E_2$ is higher than the voltage $E_o$. The second switching transistor $Tr_2$ has the base connected with the collector of the transistor $Tr_1$ through a combination of parallely disposed resistor and condenser and also connected with the positive terminal of the power source PS through a suitable resistor, the emitter connected with the emitter of the first switching transistor $Tr_1$ and the collector connected with the negative terminal of the power source PS through a pair of series connected resistors, and is adapted to be biased on when the transistor $Tr_1$ is biased off and to be biased off when the transistor $Tr_1$ is biased on.

In the switching circuit III, the transistor $Tr_3$ has the base connected with an intermediate junction of the series connected resistors disposed between the collector of the transistor $Tr_2$ and the negative terminal of the power source PS, the emitter connected with the negative terminal of the power source PS and the collector connected with the positive terminal of the power source PS through the solenoid coil Sol. This transistor $Tr_3$ is operable in synchronism with the transistor $Tr_2$ of the Schmitt circuit II for exciting or inexciting the solenoid coil Sol. The solenoid coil Sol is electrically associated in any known manner with the solenoid valve 27 shown in FIG. 1 so that the latter can be brought into the closed position when the solenoid coil Sol is inexcited and into the open position when the solenoid coil Sol is excited.

In the circuit arrangement of the control system in another embodiment of the present invention as shown in FIG. 6, the switching circuit III includes a transistor $Tr_4$ instead of the solenoid coil Sol shown in FIG. 2. In this instance, the base of the transistor $Tr_4$ is connected with the positive terminal of the power source PS through suitable resistors and the collector of the transistor $Tr_3$. This switching circuit III further includes a unidirectional semiconductor element interposed between the emitter and collector of the transistor $Tr_4$.

FIG. 3 is a chart formed by overlapping two graphs showing respective voltage-current performance curves of the thermistors $TH_1$ and $Th_2$ wherein temperature is a parameter, either of these graphs being turned inside out for the purpose of simplification. In this chart shown in FIG. 3, reference character In designates the value of current flowing through the thermistor $Th_1$ while reference character In' designates the value of current flowing through the thermistor $Th_2$. Reference character $E_o$ designates the switching voltage of the transistor $Tr_1$ which may be determined in consideration of the engine performance, each intersecting point between the temperature curves of the both graphs representing the value of base voltage to be impressed on the base of the transistor $Tr_1$. The curves shown by real lines are the performance curves of the thermistor $Th_2$ used to detect the engine temperature while the curves shown by dotted lines are the performance curves of the thermistor $Th_1$ used to detect the ambient temperature.

It is to be noted that the sum of the voltages $E_1$ and $E_2$ impressed on the thermistors $Th_1$ and $Th_2$, respectively, is substantially equal to the voltage of the power source PS. In the chart shown in FIG. 3, this voltage of the power source PS is represented by the length of a horizontal line between the In and In' lines.

Referring now to FIG. 3, in the case where the engine is to be warmed up while the ambient temperature is $-20°$ C., it is apparent that the engine temperature is substantially equal to the ambient temperature before the engine is warmed up and the voltages $E_1$ and $E_2$ are accordingly equal to each other. However, as the engine temperature increases during the warming-up operation of the engine, the intersecting point ($a$) between the engine and ambient temperature is upwardly shifted along the dotted line which represents the ambient temperature of $-20°$ C., in the rightward direction, i.e., in the direction that the voltage $E_2$ increases and the voltage $E_1$ correspondingly decreases.

When the engine temperature subsequently reaches to $20°$ C. at which time the intersecting point ($a$) is situated on a vertical line which represents the switching voltage $E_o$, as indicated by ($a'$), the voltage $E_2$ becomes equal to the voltage $E_o$. Until the voltage $E_2$ becomes equal to the voltage $E_o$, the transistor $Tr_1$ is biased off and the transistor $Tr_3$ is accordingly biased on so that the solenoid coil Sol can be excited thereby to operate the exhaust gas purifying device. When the engine temperature further increases exceeding over $20°$ C., the voltage $E_2$ will becomes higher than the switching voltage $E_o$ whereby the transistor $Tr_1$ can be biased on. As a result, the transistor $Tr_3$ can be biased off so that the solenoid coil Sol can be inexcited. Unless the solenoid coil is excited, the operation of the exhaust gas purifying device does not proceed. In other words, since the difference between the engine and ambient temperatures exceeds over the predetermined value, that is, $40°$ C. in this instance, the purifying device ceases to operate.

Alternatively, if the same engine is warmed up while the ambient temperature is about $10°$ C., the transistor $Tr_1$ can be biased off so as to excite the solenoid coil Sol only when the engine temperature is lower than $60°$ C. However, once the engine temperature exceeds over $60°$ C., the transistor $Tr_1$ can be biased on. This is because the difference between the engine and ambient temperatures exceeds over the predetermined value, that is, $50°$ C. in this instance.

As can be understood from the foregoing examples, said predetermined value can be expressed in terms of the difference between the engine and ambient temperatures of which curves intersect with each other on the vertical line representing the switching voltage $E_o$. Therefore, said predetermined value varies in accordance with variations in the ambient temperature. As hereinbefore described, it will be clearly understood that, when the intersecting point of the curves respectively representing the engine and ambient temperatures locates to the left with respect to the vertical line representing the switching voltage $E_o$, the voltage $E_2$ is smaller than the voltage $E_o$ so that the transistor $Tr_1$ is biased off and the solenoid coil Sol is excited. On the contrary thereto, when the intersecting point locates to the right with respect to the vertical line representing the switching voltage $E_o$, the voltage $E_2$ is greater than the voltage $E_o$ so that the transistor $Tr_1$ is biased on and the solenoid coil Sol is inexcited. Thus, it will also be clearly understood that the transistor $Tr_1$ can be driven only when the difference between the engine and ambient temperatures exceeds over the predetermined value.

However, in practice, it is preferable that the voltage $E_2$ should become higher than the switching voltage $E_o$ thereby to bias the transistor $Tr_1$ on when the engine temperature reaches, for example, to $35°$ C. in case of the ambient temperature of $-30°$ C., $56°$C. in case of the ambient temperature of $0°$ C., $61°$ C. in case of the ambient temperature of $30°$ C., and so on as can be clearly contemplated from the chart shown in FIG. 4 wherein the thermistor for detecting the engine temperature is used to detect the temperature of cooling medium employed to cool the warmed engine. More particularly, as shown in FIG. 4, the performance characteristic of the thermistor for detecting the engine temperature should be such that variation in its resistance relative to the ambient temperature takes place in a manner shown by the chart.

Referring back to FIG. 1, the solenoid valve 27 can be operated in response to the operation of the solenoid coil Sol as hereinbefore described. Especially, when the engine is initially warmed up in the low load and speed ranges while the clutch is disengaged, the value of the difference between the engine and ambient temperatures is so small that the solenoid coil Sol can be excited in such a manner as hereinbefore described and the solenoid valve 27 is, therefore, brought into the open position. Since the throttle valve is at this time closed, the piston member 35 of the relief valve 28 can be moved to the left for closing the communication between the conduits 32 and 34 as the solenoid valve 27 is opened whereby the secondary air can be supplied to the thermal reactor 13 as hereinbefore described. Of course, when the solenoid coil Sol is inexcited, the supply of the secondary air thereto can be stopped.

The circuit arrangement of the control system according to the present invention as shown in FIG. 2 can be applied to the exhaust gas purifying device shown in FIG. 5 which is in the form of a device for controlling the ignition timing.

In the device shown in FIG. 5, reference numerals 50a and 50b designate ignition coils of any known construction which are respectively connected with a common power source DC for generating high voltage applicable to ignite, in the instance as shown, two pairs of spark plugs 55a, 56a and 55b, 56b. Reference numerals 51a and 51b designate ignition current distributor assemblies, one of which being exploded into a contact breaker section 52a and a distributor section 52b while the other of which being of any known construction. The contact breaker section 52a of the ignition current distributor assembly 51a includes a first breaker unit 53 operable in a known manner so as to ignite the plugs 55a and 55b in synchronism with the plugs 56a and 56b which can be ignited by means of the other distributor assembly 51b in a normal ignition timing, and a second breaker unit 54 operable so as to ignite the plugs 55a and 55b in a delayed relation with respect to the ignition of the plugs 56a and 56b. More particularly, the first breaker unit 53 is provided with a fixed contact connected to the ground and a breaker arm formed at its intermediate portion with a projection which is also normally in contact with the periphery of the rotatable cam plate 57. However, while the breaker arm of the first breaker unit 53 is adapted to release from the fixed contact thereof when the projection of the breaker arm thereof is in register with any one of apexes of the rotatable cam plate 57, the second breaker unit 54 is designed such that the contact breaker arm can be engaged with its fixed contact. It is to be noted that the second breaker unit 54 is not provided in the distributor assembly 51b associated with the plugs 56a and 56b.

While in this arrangement, a switch S is adapted to be operated by the solenoid coil Sol shown in FIG. 2. As is well known, when the Switch S is closed a relay assembly 58 can be operated in such a manner that a movable contact 59 which is normally engaged with a first fixed contact 60 can be engaged with a second fixed contact 61 whereby the second breaker unit 54 is utilized to ignite the plugs 55a and 55b in the delayed relation with respect to the ignition of the plugs 56a and 56b. On the contrary, unless the solenoid coil Sol is excited, the switch S is in the open position and the movable contact 59 of the relay assembly 58 is, therefore, engaged with the first contact 59 whereby the first breaker unit 53 is utilized to ignite the plugs 55a and 55b. At the same time, the plugs 56a and 56b are also ignited by means of the distributor assembly 51b in the synchronized relation with respect to the ignition of the plugs 55a and 55b. It is to be noted that the rotatable cam plate 57 of the distributor assembly 51a is drivingly aligned with a rotatable contact 62 as is well known to those skilled in the art.

The exhaust gas purifying device shown in FIG. 5 further includes a vacuum switch assembly VS and a detector switch DS connected in series with said vacuum switch assembly VS. These switch assemblies VS and DS are disposed in parallel relation with respect to the switch S so that the relay assembly 58 can be operated even if the solenoid coil Sol is inoperative as will be mentioned later.

This vacuum switch assembly VS can be operated in such a manner that a pair of fixed contacts 63a and 63b can be connected by a bridging member 64 when the negative pressure in the intake manifold is relatively high, i.e., while the engine is in the low load and speed ranges. Unless the negative pressure in the intake manifold is relatively high, this bridging member 64 is in position to clear off the fixed contacts 63a and 63b. The detector switch DS is operable in a similar manner to the operation of the detector 39 shown in FIG. 1.

As can be understood from the foregoing description, the vacuum switch and the detector switch can be concurrently closed only when the engine is in the low load and speed operation. When these switches are closed the operation of the other circuit components of the ignition system proceeds in substantially the same manner as that when the switch S is closed.

In FIG. 6, the circuit arrangement of the control system according to the present invention is adapted to switch off all of the spark plugs 55a and 55b associated with the distributor assembly 51a when the engine is in the low load and speed range. In this instance, the switching circuit III of the circuit arrangement comprises, as hereinbefore described, the transistor $Tr_3$ and the transistor $Tr_4$ operable in the opposite manner to said transistor $Tr_3$. The detector switch DS' and the vacuum switch VS' are disposed in parallel relation to each other, the detector switch being adapted to be closed when the engine speed is relatively high while the vacuum switch being adapted to be closed when the engine is in the high load range (when the throttle valve is substantially opened).

In operation, when the difference between the engine and ambient temperatures remain smaller than the predetermined value and the transistor $Tr_4$ is, therefore, biased off, voltage can be supplied from the common power source PS to the ignition coil 50b so that the spark plugs 56a and 56b can be ignited while the plugs 55a and 55b are switched off. On the contrary thereto, when the difference exceeds over the predetermined value and the transistor $Tr_4$ is, therefore, biased on, the voltage from the common power source PS can be concurrently supplied to the ignition coil 50b and the ignition coil 50a through either of the vacuum switch or the detector switch. However, so long as the engine remains in the low load and speed ranges even after the engine is warmed up, the detector switch DS' and the vacuum switch VS' are opened so that the plugs 55a and 55b can be switched off.

Although the present invention has been fully described by way of example wherein the thermistors of the same construction are employed for thermal responsible resistance elements, various modification and change are apparent to those skilled in the art. For example, the thermistors of different construction or "Posistor" elements (Registered Trademark owned by Murata Mfg., Ltd. and manufactured thereby) each having the performance characteristic opposed to that of the thermistor may be employed. In addition, the resistors $R_1$ and $R_2$ may be singly or in combination replaced by variable resistors for providing versatility and the Schmitt circuit II may be also replaced by other differential amplifying circuit. Accordingly, it is to be noted that the present invention is not to be limited to the foregoing embodiments.

What is claimed is;

1. A control system operable in response to a difference between the temperature of an internal combustion engine and the temperature of environment of the engine for decontaminating the exhaust gases present in the exhaust system of the combustion engine, which comprises an exhaust gas purifying device, a first detector for detecting the engine temperature, a second detector for detecting the ambient temperature, and means for controlling said exhaust gas purifying device in response to the difference between the engine and ambient temperatures in such a manner that, when said difference is smaller than a predetermined value which varies in accordance with variations in the ambient temperature, said exhaust gas purifying device is brought into an operative position for decontaminating the exhaust gases.

2. A control system according to claim 1, wherein said exhaust gas purifying device includes a nozzle disposed to permit the supply of a secondary air to an exhaust system and communicated with an air feeder through a conduit, a relief valve disposed on said conduit and operable so as to permit the discharge of the secondary air in said conduit when said valve is open whereby, when said difference is smaller than the predetermined value, said relief valve is closed to permit the supply of the secondary air to the exhaust system and, when said difference exceeds the predetermined value, said relief valve is opened to cut off the supply of said secondary air to the exhaust system.

3. A control system according to claim 1, wherein said exhaust gas purifying device includes a spark plug ignition device associated with at least one spark plug, and having a contact breaker assembly formed with first and second breaker units each having movable and fixed contacts, said first breaker unit being operable in a normal ignition timing and said second breaker unit being operable in a delayed relation with respect to said first breaker unit in such a manner that, when said difference is smaller than the predetermined value, said second breaker unit is closed to ignite the associated spark plug and, when said difference exceeds the predetermined value, said first breaker unit is closed to ignite the associated spark plug.

4. A control system according to claim 3, wherein said exhaust gas purifying device further includes a relay assembly connected in series with a combination of series connected vacuum switch and detector switch, said vacuum switch being operable in response to the negative pressure present in an intake manifold and said detector switch being operable in response to the engine speed, said relay assembly being adapted to switch over the first breaker unit to the second breaker unit in such a manner that, when the difference is the predetermined value or the engine is in the lower load and speed operation, said second breaker unit is closed to ignite the associated spark plug. 5.

5. A control system according to claim 1, wherein said exhaust gas purifying device includes a spark plug ignition device associated with at least two spark plugs both exposed to one combustion chamber, and operable in such a manner that, when the difference is smaller than the predetermined valve, at least one of the plugs exposed to one combustion chamber is ignited in a delayed ignition timing and, when said difference exceeds the predetermined value, all of said plugs are ignited in a normal ignition timing.

6. A control system according to claim 5, wherein said exhaust gas purifying device further includes a vacuum switch operable in response to the negative pressure present in an intake manifold and a detector switch operable in response to the engine speed whereby, when the difference is smaller than the predetermined value or the engine as in the lower load and speed operation, at least one of the spark plugs exposed to one combustion chamber is ignited in a delayed ignition timing by means of said both switches.

7. A control system according to claim 1, wherein each of said first and second detectors comprises a thermistor and said controlling means consists of a comparison circuit effective to compare between the engine and ambient temperature to give said difference and a switching circuit operable in response to said difference, whereby said exhaust gas purifying device is brought into the inoperative position when said difference exceeds the predetermined value.

8. A control system according to claim 1, wherein said exhaust gas purifying device includes a spark plug ignition device associated with at least two spark plugs both exposed to one combustion chamber, and operable in such a manner that, when the difference is smaller than the predetermined value, at least one of the plugs exposed to the one combustion chamber is switched off and, when said difference exceeds the predetermined value, all of said plugs are ignited in a normal ignition timing.

9. A control system according to claim 8, wherein said exhaust gas purifying device further includes a vacuum switch operable in response to the negative pressure present in an intake manifold and a detector switch operable in response to the engine speed whereby, when the difference is smaller than the predetermined value or the engine speed is in the lower load and speed operation, at least one of the spark plugs exposed to one combustion chamber is switched off by means of said both switches.

* * * * *